(12) United States Patent
Yonemoto

(10) Patent No.: US 8,389,641 B2
(45) Date of Patent: Mar. 5, 2013

(54) MODIFIED DIENE RUBBER, PRODUCTION METHOD THEREOF, AND RUBBER COMPOSITION AND TIRE USING THE RUBBER

(75) Inventor: Makiko Yonemoto, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 155 days.

(21) Appl. No.: 12/918,218

(22) PCT Filed: Feb. 16, 2009

(86) PCT No.: PCT/JP2009/052544
§ 371 (c)(1),
(2), (4) Date: Aug. 18, 2010

(87) PCT Pub. No.: WO2009/104555
PCT Pub. Date: Aug. 27, 2009

(65) Prior Publication Data
US 2011/0003911 A1  Jan. 6, 2011

(30) Foreign Application Priority Data

Feb. 18, 2008 (JP) ................. 2008-036375

(51) Int. Cl.
*C08C 19/22* (2006.01)
(52) U.S. Cl. ............. 525/333.1; 525/331.9; 525/333.2; 525/376; 525/388
(58) Field of Classification Search ............ 525/331.9, 525/333.1, 333.2, 376, 388
See application file for complete search history.

(56) References Cited

U.S. PATENT DOCUMENTS

| | | | | |
|---|---|---|---|---|
| 3,790,549 | A | * | 2/1974 | Feniak ............... 525/333.7 |
| 5,856,600 | A | | 1/1999 | Tanaka et al. |
| 6,380,288 | B1 | | 4/2002 | Hojo et al. |
| 2007/0010610 | A1 | | 1/2007 | Kondo |

FOREIGN PATENT DOCUMENTS

| | | |
|---|---|---|
| DE | 138070 A1 | 10/1979 |
| EP | 1803740 A1 | 7/2007 |
| JP | 8-27315 * | 1/1996 |
| JP | 8-27315 A | 1/1996 |
| JP | 08-081505 A | 3/1996 |
| JP | 09-136903 A | 5/1997 |
| JP | 10-330549 A | 12/1998 |
| JP | 2001-172435 A | 6/2001 |
| JP | 2001-261707 A | 9/2001 |
| JP | 2004-359717 A | 12/2004 |
| JP | 2007-204637 A | 8/2007 |
| JP | 2007-277310 A | 10/2007 |
| WO | 2004-106397 A1 | 12/2004 |

OTHER PUBLICATIONS

Machine translation of JP 08-027315, Jan. 1996.*
http://en.wikipedia.org/wiki/Hydrazide, Mar. 2012.*
Eurico de Barros Lobo Filho, et al., "Degradation controlee des polyisoprenes-1,2 par le couple phenylhydrazine/oxygene,1", Makromol. Chem., 1985, pp. 2037-2047, vol. 186 (XP-002631996).
Lechner, Gehrke, Nordmeier: "Makromolekulare Chemie", 2003, Birkhauser Verlag, Basel (XP-002632029).
Office Action issued Jul. 13, 2011 in Chinese Patent Application No. 200880114099.0 with English translation.
Notification of First Office Action, mailed May 21, 2012, as issued from the Chinese Patent Office, in corresponding Chinese Patent Application No. 200980112949.8, along with an English translation thereof.
Office Action issued Feb. 27, 2012 in European Patent Application No. 09712057.0.
Notification of Second Office Action, issued Dec. 27, 2012 in corresponding Chinese Patent Application No. 200980112949.8, along with an English translation thereof.

* cited by examiner

*Primary Examiner* — Roberto Rabago
(74) *Attorney, Agent, or Firm* — Sughrue Mion, PLLC

(57) ABSTRACT

The present invention provides a modified diene rubber which can be produced economically and improve low-loss properties and wear resistance of a rubber composition made therefrom, as compared with the conventional modified diene rubber. The present invention further provides: a method of producing the modified diene rubber; a rubber composition using the modified diene rubber; and a tire using the rubber composition. Specifically, the present invention provides: a modified diene rubber, produced by first oxidizing diene rubber latex and then adding a polar group-including hydrazide compound to a terminal end of a molecular chain of the diene rubber; a rubber composition, comprising the modified diene rubber; and a tire, comprising a tire member made of the rubber composition.

17 Claims, No Drawings

MODIFIED DIENE RUBBER, PRODUCTION METHOD THEREOF, AND RUBBER COMPOSITION AND TIRE USING THE RUBBER

CROSS REFERENCE TO RELATED APPLICATIONS

This application is a National Stage of International Application No. PCT/JP2009/052544 filed Feb. 16, 2009, which claims priority from Japanese Patent Application No. 2008-036375, filed on Feb. 18, 2008, the contents of all of which are incorporated herein by reference in their entirety.

TECHNICAL FIELD

The present invention relates to a modified diene rubber, a production method thereof, a rubber composition using the modified diene rubber, and a tire using the rubber composition. In particular, the present invention relates to a rubber composition which can be produced more economically and exhibits better performances in low-loss properties, wear resistance and fracture resistance than the conventional rubber composition.

PRIOR ART

Automobiles having relatively low fuel consumption are increasingly in demand in recent years and tires having relatively low rolling resistance are being pursued. Therefore, there has been a demand for a rubber composition having relatively low tan δ (which feature will be referred to as "low-loss properties" hereinafter) and excellent in low-heat generation property, as a rubber composition for use in tread or the like of a tire. Further, a rubber composition for use in tread is also required of having good wear resistance and good fracture resistance in addition to good low-loss properties. In view of this, in order to improve low-loss properties, wear resistance and fracture resistance of a rubber composition, it is effective to improve compatibility between a filler such as carbon black and silica and a rubber component of the rubber composition.

For example, there has been developed a synthetic rubber of which compatibility with respect to a filler is improved by modification of a terminal end, a synthetic rubber of which compatibility with respect to a filler is improved by copolymerization of functional group-including monomers, and the like, in order to enhance compatibility between a filler and a rubber component of a rubber composition to improve a reinforcing effect by the filler.

On the other hand, regarding natural rubber, there has been disclosed a technique in which: a modified natural rubber is obtained by adding a monomer including a polar group to natural rubber latex to cause the polar group-including monomer to be graft-polymerized with natural rubber molecules of the natural rubber latex, and coagulating and drying the polymerized product; and the modified natural rubber thus obtained is used as a rubber composition, so as to improve compatibility between a rubber component and a filler to enhance the reinforcing properties of a rubber composition and thus improve the low-loss properties, wear resistance and fracture resistance of the rubber composition (see WO 2004/106397).

Use of a modified natural rubber disclosed in WO 2004/106397 as a rubber component improves compatibility between a rubber component and a filler, whereby low-loss properties, wear resistance and the like of a rubber composition improve, as described above. However, there has been a demand for further improvement of low-loss properties and wear resistance of a rubber composition in recent years.

In view of chain-like molecular movement of molecules of a modified natural rubber, it is anticipated that a modified natural rubber having a polar group at a terminal end of a molecule thereof has a higher interacting effect with respect to a filler than a modified natural rubber having a polar group within a molecular chain thereof. In the aforementioned techniques of modifying synthetic rubber, there has actually been obtained a relatively high modifying effect by the synthetic rubber having a modified terminal end, for a reason similar to that described above. However, according to the techniques described in WO 2004/106397, although a polar group can be introduced to the main chain of a natural rubber molecule, the position at which the polar group is introduced to the main chain is not restricted to a terminal end of the molecule. In view of this, there has been disclosed, as a technology of further improving low-loss properties, wear resistance and fracture resistance of a rubber composition by modifying a terminal end of the main chain of a molecular of natural rubber, a technique of introducing a polar group to a terminal end of the main chain of a molecule of natural rubber by using metathesis catalyst and olefin including a polar group (JP 2007-204637).

DISCLOSURE OF THE INVENTION

Problems to be Solved by the Invention

In the technology of introducing a polar group to a terminal end of the main chain of a molecule of natural rubber by using metathesis catalyst and olefin including a polar group disclosed in JP 2007-204637, production cost increases because the metathesis catalyst for use in producing the modified natural rubber is expensive. Moreover, further improvement of low-loss properties and wear resistance of a rubber composition is increasingly in demand not only for a rubber composition using natural rubber but also rubber compositions using other diene rubbers.

Accordingly, an object of the present invention is to provide a modified diene rubber which can be more economically produced than the conventional modified diene rubber and, when used as a rubber component of a rubber composition, can improve low-loss properties and wear resistance of the rubber composition. Another object of the present invention is to provide a method of producing the aforementioned modified diene rubber. An yet another object of the present invention is to provide a rubber composition using the modified diene rubber and a tire using the rubber composition.

Means for Solving the Problems

As a result of a keen study for achieving the aforementioned objects, the inventors have discovered that: a polar group can be introduced in a simple, easy and economical manner to a terminal end of a molecule chain of a diene rubber by first oxidizing diene rubber latex and then adding a polar group-including hydrazide compound thereto; and low-loss properties and wear resistance can be significantly improved by using the modified diene rubber thus obtained, as a rubber component of a tire, thereby completing the present invention.

In short, a modified diene rubber of the present invention is characteristically produced by first oxidizing diene rubber latex and then adding a polar group-including hydrazide compound to a terminal end of a molecular chain of the diene rubber.

In a preferred example of the modified diene rubber of the present invention, the diene rubber latex is natural rubber latex.

In another preferred example of the modified diene rubber of the present invention, an amount of the polar group-including hydrazide compound to be added is 0.01 to 5.0 mass % with respect to a rubber component(s) in the diene rubber latex.

In yet another preferred example of the modified diene rubber of the present invention, the polar group of the polar group-including hydrazide compound is at least one type of polar group selected from the group consisting of amino, imino, nitryl, ammonium, imido, amido, hydrazo, azo, diazo, hydroxyl, carboxyl, carbonyl, epoxy, oxycarbonyl group, nitrogen-containing heterocyclic group, oxygen-containing heterocyclic group, tin-containing group and alkoxysilyl group.

In yet another preferred example of the modified diene rubber of the present invention, the weight-average molecular weight thereof measured by Gel Permeation Chromatography (GPC) in terms of polystyrene equivalents is not smaller than 200,000.

In yet another preferred example of the modified diene rubber of the present invention, oxidation of the diene rubber latex is characteristically carried out by adding a carbonyl compound to the diene rubber latex to effect oxidization of the latex. In the present invention, the oxidation is carried out by air oxidation or ozone oxidation.

In yet another preferred example of the modified diene rubber of the present invention, the air oxidation is carried out under the presence of a radical-generating agent.

In yet another preferred example of the modified diene rubber of the present invention, the carbonyl compound is an aldehyde and/or a ketone.

In yet another preferred example of the modified diene rubber of the present invention, the radical-generating agent is selected from the group consisting of a peroxide radical-generating agent, a redox radical-generating agent and an azo radical-generating agent.

Further, in another aspect of the present invention, a modified diene rubber has at a terminal end of a molecular chain of diene rubber a functional group including a polar group, the functional group being represented by formula (1) below.

(1)

In the formula (1), R represents at least one type of polar group selected from the group consisting of: C1-C4 alkylene group having at least one type of a polar group selected from the group consisting of amino, imino, nitryl, ammonium, imido, amido, hydrazo, azo, diazo, hydroxyl, carboxyl, carbonyl, epoxy, oxycarbonyl group, tin-containing group and alkoxysilyl group; a phenylene group having as a substituent group at least one type of said polar groups; and nitrogen-containing heterocyclic group, oxygen-containing heterocyclic group.

Further, a first method of producing a modified diene rubber of the present invention is characterized in that the method comprises the steps of: oxidizing a diene rubber latex; coagulating the oxidized diene rubber latex; adding a polar group-including hydrazide compound to the coagulated product of the oxidized diene rubber latex thus obtained, thereby causing the polar group-including hydrazide compound to be reacted with and added to a terminal end of a molecular chain of diene rubber of the coagulated product of the oxidized diene rubber latex; and drying the resulting product.

Yet further, a second method of producing a modified diene rubber of the present invention is characterized in that the method comprises the steps of: oxidizing a diene rubber latex; coagulating and drying the oxidized diene rubber latex; and adding a polar group-including hydrazide compound to the coagulated and dried product of the oxidized diene rubber thus obtained, thereby causing the polar group-including hydrazide compound to be reacted with and added to a terminal end of a molecular chain of diene rubber of the coagulated and dried product of the oxidized diene rubber.

Yet further, a third method of producing a modified diene rubber of the present invention is characterized in that the method comprises the steps of: oxidizing a diene rubber latex; adding a polar group-including hydrazide compound to the oxidized diene rubber latex thus obtained, thereby causing the polar group-including hydrazide compound to be reacted with and added to a terminal end of a molecular chain of diene rubber of the oxidized diene rubber latex; and coagulating and drying the resulting product.

Yet further, a rubber composition of the present invention is characterized in that the rubber composition comprises the aforementioned modified diene rubber. A tire of the present invention is characterized in that the tire comprises a tire member made of the aforementioned rubber composition.

Effect of the Invention

According to the present invention, there are obtained advantageous effects of providing a modified diene rubber and a method of producing the modified diene rubber, which modified diene rubber can be produced economically and, when used as a rubber component of a rubber composition, significantly improve low-loss properties and wear resistance of the rubber composition, as compared with the conventional rubber composition. Further, there are obtained advantageous effects of providing a rubber composition and a tire excellent in low-loss property and wear resistance by using the modified diene rubber therein.

BEST MODE FOR IMPLEMENTING THE INVENTION

Hereinafter, the invention will be described in detail. A modified diene rubber of the present invention is characteristically produced by first oxidizing diene rubber latex and then adding a polar group-including hydrazide compound to a terminal end of a molecular chain of the diene rubber. This modified diene rubber, where a polar group exists at a terminal end of a molecular chain of diene rubber, exhibits better compatibility with respect to various fillers such as carbon black and silica than a modified diene rubber like the modified natural rubber as disclosed in WO 2004/106397 in which a polar group exists in an inner portion of a molecular chain. Further, a rubber composition using as a rubber component the modified diene rubber of the present invention has better dispersion properties of fillers with respect to the rubber component and more sufficiently causes a reinforcing effect by the fillers, than a rubber composition using as a rubber component the modified diene rubber in which a polar group exists in an inner portion of a molecular chain described above, thereby exhibiting improved wear resistance and low-loss properties (i.e. low heat-generating properties). Yet further, rolling resistance can be remarkably reduced and wear resistance can be significantly improved by using the rubber composition of the present invention in a tire, in particular, a tread of a tire.

Examples of diene rubber latex for use in an oxidizing reaction to produce the modified diene rubber of the present invention include natural rubber latex, polyisoprene rubber latex, styrene-butadiene copolymer rubber latex, polybutadiene rubber latex, acrylonitryl-butadiene rubber latex, and chloroprene rubber latex. These examples of the diene rubber latex may be used either solely or in combination of two or more types thereof. In the case of synthetic rubber, a polar group can be introduced to a terminal end of a molecular chain during the polymerization process. However, in the case of natural rubber as a natural product, such introduction of a polar group thereto is conventionally impossible unless a technique of using metathesis catalyst, or the like, is employed. Therefore, in view of a fact that the present invention makes it possible to introduce a polar group to a terminal end of a molecular chain of natural rubber against the odds, it is preferable to use natural rubber latex among the aforementioned examples.

Acceptable examples of natural rubber latex for use include field latex, ammonia-treated latex, centrifugal condensed latex, deproteinized latex treated by surfactant or enzyme, and any combination thereof. The purity of natural rubber latex may be increased to reduce a side reaction.

The diene rubber latex may be oxidized by a known method. For example, a diene rubber latex may be oxidized by dissolving 1 to 30 mass % of the diene rubber latex in an organic solvent and then air-oxidizing the dissolved diene rubber latex under the presence of a metal-based oxidizing catalyst according to JP 08-081505. Preferable examples of metal species used as the metal-based oxidizing catalyst to facilitate air oxidation include cobalt, cupper, iron and the like. Specifically, a salt or a complex of these metals with a chloride or an organic compound is used. Among the aforementioned examples, a cobalt-based catalyst such as cobalt chloride, cobaltous(II) acetylacetonate, cobalt naphthenate are preferable.

Any organic solvent can be used as the organic solvent as long as the solvent itself is not reacted with the rubber, is not easily oxidized and dissolves rubber. Various types of hydrocarbon solvent, aromatic hydrocarbon solvent, and organic halogen solvent and the like can be suitably used. Examples of hydrocarbon solvent which can be used include hexane, gasoline and the like. Examples of aromatic hydrocarbon solvent which can be used include toluene, xylene, benzene and the like. Examples of organic halogen solvent which can be used include chloroform, dichloromethane and the like. Toluene as an aromatic hydrocarbon is preferable for use among these examples. Further, a solvent as mixture of the aforementioned solvent and alcohol or the like may be used.

A diene rubber latex can be oxidized by adding a carbonyl compound to the diene rubber latex to effect oxidation of the diene rubber latex, as disclosed in JP 09-136903. The carbonyl compound is appropriately added to the diene rubber latex by adding not more than 20 vol. % (V/V %), preferably 0.5 to 10 vol. %, of the carbonyl compound with respect to the latex volume, regardless of the types of the rubber content. The concentration of the carbonyl compound exceeding the aforementioned range will not cause a problem, in particular. However, such a high concentration of the carbonyl compound does not contribute to enhancing reactivity but may rather be economically disadvantageous. Preferable examples of the carbonyl compound include various types of aldehydes, ketones and the like.

Examples of the aldehyde include formaldehyde, acetoaldehyde, propionaldehyde, n-butylaldehyde, n-valeraldehyde, caproaldehyde, heptalaldehyde, phenylacetoaldehyde, benzaldehyde, tolualdehyde, nitrobenzaldehyde, salicylaldehyde, anisaldehyde, vanilline, piperonyl aldehyde, methylvaleraldehyde, isocaproaldehyde, paraformaldehyde and the like.

Examples of the ketone include acetone, methyethyl ketone, methyl-n-propyl ketone, diethyl ketone, isopropylmethyl ketone, benzylmethyl ketone, 2-hexanone, 3-hexanone, isobutylmethyl ketone, acetophenone, propiophenone, n-butylophenone, benzophenone, 3-nitro-4'-methylbenzophenone and the like.

A diene rubber latex can be oxidized by adding the aforementioned carbonyl compound thereto. In a case where air oxidation is carried out as the oxidizing method, air oxidation is preferably carried out under the presence of a radial-generating agent to facilitate air oxidation, as disclosed in JP 09-136903. Preferable examples of the radical-generating agent include a peroxide radical-generating agent, a redox radical-generating agent, an azo radical-generating agent and the like. Examples of the peroxide radical-generating agent which can be used include benzoyl peroxide, di-t-butyl peroxide, potassium persulfate, ammonium persulfate, hydrogen peroxide, lauroyl peroxide, diisopropylperoxy carbonate, dicyclohexylperoxy carbonate and the like.

Examples of the redox redical-generating agent which can be used include combination of: cumenehydroxy peroxide and a Fe(III) salt; hydrogen peroxide and a Fe(II) salt; potassium persulfate or ammonium persulfate and sodium sulfite; sodium perchlorate and sodium sulfite; cerium(IV) sulfate and alcohol, amine or starch; a peroxide such as benzoyl peroxide or laroyl peroxide and dimethylaniline; tert-butylhydroperoxide and tetraethylenepentamine; and the like.

Examples of the azo radical-generating agent which can be used include azobisisobutylonitrile, dimethyl-2,2'-azobis (isobutyrate), azobis(cyclohexane-carbonitrile), azobisisobutylamidine hydrochloride, 4,4'-azobis(4-cyanovaleric acid) and the like.

The radical-generating agent, when it is used, is dissolved or dispersed in the diene rubber latex. The appropriate amount of the radical-generating agent to be added is 0.01 to 5 mass %, preferably 0.05 to 1 mass %, with respect to the solid portion of the diene rubber. The concentration of the radical-generating agent lower than the aforementioned range results in a lower rate of air oxidation and is not practical. On the other hand, the concentration of the radical-generating agent exceeding the aforementioned range facilitates cutting of molecular chains and decreases the molecular weight, possibly deteriorating low-loss properties, wear resistance and fracture resistance of a rubber composition made therefrom.

In air oxidation, it is preferable to bring a solution into even contact with air. The method of bringing a solution into even contact with air is not particularly restricted, and examples thereof, which can be easily implemented, include agitating the solution in a shaking flask, stirring the solution, blowing air into the solution by bubbling and the like. Air oxidation is carried out normally at a temperature in the range of the room temperature to 100° C. but is not particularly restricted thereto. An air oxidation reaction is completed normally for 1 to 5 hours or so.

Alternatively, a diene rubber latex can be oxidized through an oxidizing effect by ozone by blowing an ozone-containing gas into the diene rubber latex in accordance with JP 2001-261707. According to this method, a cracking reaction is facilitated by addition of hydrogen peroxide.

In the present invention, the aforementioned diene rubber latex is oxidized by the techniques described above and then a polar group-containing hydrazide compound is added thereto. In the present embodiment, as described below, the polar group-containing hydrazide compound may be added to either an oxidized diene rubber latex obtained by oxidizing the diene rubber latex or an oxidized diene rubber obtained by coagulating the oxidized diene rubber latex.

The oxidized diene rubber latex obtained by the techniques described above has a carbonyl group at a terminal end of a molecular chain of the diene rubber. The polar group-including hydrazide compound, which is highly reactive, is easily reacted with the carbonyl group at a terminal end of diene rubber molecule in either the oxidized diene rubber latex or the oxidized diene rubber obtained by coagulating the oxidized diene rubber latex. Accordingly, a polar group can be introduced in a simple, easy and economical manner to a terminal end of diene rubber molecule without using an expensive catalyst by adding the polar group-including hydrazide compound to the oxidized diene rubber latex or the oxidized diene rubber.

The type of the polar group-including hydrazide compound is not particularly restricted as long as it is a hydrazide compound including at least a polar group within a molecule thereof. Specific examples of the polar group, which can be suitably used, include amino, imino, nitoryl, ammonium, imido, amido, hydrazo, azo, diazo, hydroxyl, carboxyl, carbonyl, epoxy, oxycarbonyl group, nitrogen-containing heterocyclic group, oxygen-containing hererocyclic group, tin-containing group, alkoxysilyl group, and the like. The hydrazide compounds including such a polar group as described above may be used solely or in combination of two or more types thereof.

Examples of the amino group-including hydrazide compound include a hydrazide compound having in one molecule thereof at least one amino group selected from the group consisting of a primary amine, a secondary amine and a tertiary amine. The amino group-including hydrazide compound may be used solely or in combination of two or more types thereof.

Examples of the primary amino group-including hydrazide compound include 2-aminoacetohydrazide, 3-aminopropionic hydraxzide, 4-aminobutanoic hydrazide, 2-aminobenzohydrazide, 4-aminobenzohydrazide, and the like.

Examples of the secondary amino group-including hydrazide compound include 2-(methylamino)acetohydrazide, 2-(ethylamino)acetohydrazide, 3-(methylamino) propionic hydrazide, 3-(ethylamino)propionic hydrazide, 3-(propylamino)propionic hydrazide, 3-(isopropylamino) propionic hydrazide, 4-(methylamino)butanoic hydrazide, 4-(ethylamino)butanoic hydrazide, 4-(propylamino)butanoic hydrazide, 4-(isopropylamino)butanoic hydrazide, 2-(methylamino)benzohydrazide, 2-(ethylamino)benzohydrazide, 2-(propylamino)benzohydrazide, 2-(isopropylamino)benzohydrazide, 4-(methylamino)benzohydrazide, 4-(ethylamino)benzohydrazide, 4-(propylamino)benzohydrazide, 4-(isopropylamino)benzohydrazide, and the like.

Examples of the tertiary amino group-including hydrazide compound include a N,N-di-substituted aminoalkyl hydrazide compound and a N,N-di-substituted benzohydrazide compound, and the like. Specific examples of these compounds include 2-(dimethylamino)acetohydrazide, 2-(diethlyamino)acetohydrazide, 3-(dimethylamino)propionic hydrazide, 3-(diethylamino)propionic hydrazide, 3-(dipropylamino)propionic hydrazide, 3-(diisopropylamino)propionic hydrazide, 4-(dimethylamino)butanoic hydrazide, 4-(diethylamino)butanoic hydrazide, 4-(dipropylamino)butanoic hydrazide, 4-(diisopropylamino)butanoic hydrazide, 2-(dimethylamino)benzohydrazide, 2-(diethylamino)benzohydrazide, 2-(dipropylamino)benzohydrazide, 2-(diisopropylamino)benzohydrazide, 4-(dimethylamino) benzohydrazide, 4-(diethylamino)benzohydrazide, 4-(dipropylamino)benzohydrazide, 4-(diisopropylamino)benzohydrazide, and the like.

A nitrogen-containing heterocyclic group may be used instead of an amino group. Examples of the nitrogen-containing heterocyclic group in such a case as described above include pyrrol, histidine, imidazole, triazolidine, triazole, triazine, pyridine, pyrimidine, pyrazine, indole, xynoline, purine, phenazine, puteridine, melamine, and the like. The nitrogen-containing heterocyclic group may contain another type of hetero atom in the rings. Examples of the hydrazide compound having pyridyl group as the nitrogen-containing heterocyclic group include isonicotinohydrazide, pycolinohydrazide, and the like. These hydrazide compounds including a heterocyclic group containing nitrogen may be used solely or in combination of two or more types thereof.

Examples of the hydrazide compound including nitryl group include 2-nitroacetohydrazide, 3-nitropropionic hydrazide, 4-nitrobutanoic hydrazide, 2-nitrobenzohydrazide, 4-nitrobenzohydrazide, and the like. These hydrazide compounds including netryl group may be used solely or in combination of two or more types thereof.

Examples of the hydroxyl group-including hydrazide compound include a hydrazide compound having in one molecule thereof at least one hydroxyl group selected from the group consisting of a primary hydroxyl group, a secondary hydroxyl group, and the third hydroxyl group. Examples of such a hydroxyl group-including hydrazide compound as described above include 2-hydroxyacetohydrazide, 3-hydroxypropionic hydrazide, 4-hydroxybutanoic hydrazide, 2-hydroxybenzohydrazide, 4-hydroxybenzohydrazide, and the like. These hydroxyl group-including hydrazide compounds may be used solely or in combination of two or more types thereof.

Examples of the carboxyl group-including hydrazide compound include 3-carboxypropionic hydrazide, 4-carboxybutanoic hydrazide, 2-benzoic hydrazide, 4-benzoic hydrazide, and the like. These carbonyl group-including hydrazide compounds may be used solely or in combination of two or more types thereof.

Examples of the epoxy group-including hydrazide compound include 2-(oxyrane-2-yl)acetohydrazide, 3-(oxyrane-2-yl)propionic hydrazide, 3-(tetrahydro-2H-pyran-4-yl)propionic hydrazide, and the like. These epoxy group-including hydrazide compounds may be used solely or in combination of two or more types thereof.

Examples of the hydrazide compound having a tin-containing group include 3-(tributyltin)propionic hydrazide, 3-(trimethyltin)propionic hydrazide, 3-(triphenyltin)propionic hydrazide, 3-(trioctyltin)propionic hydrazide, 4-(tributyltin)butanoic hydrazide, 4-(trimethyltin)butanoic hydrazide, 4-(triphenyltin)butanoic hydrazide, 4-(trioctyltin) butanoic hydrazide, 2-(tributyltin)benzohydrazide, 4-(tributyltin)benzohydrazide, 2-(trimethyltin)benzohydrazide, 4-(trimethyltin)benzohydrazide, 2-(trioctyltin)benzohydrazide, 4-(trioctyltin)benzohydrazide, and the like. These tin-containing hydrazide compounds may be used solely or in combination of two or more types thereof.

Examples of the alkoxysilyl group-including hydrazide compound include 2-(trimethoxysilyl)acetohydrazide, 2-(triethoxysilyl)acetohydrazide, 3-(trimethoxysilyl)propionic hydrazide, 3-(triethoxysilyl)propionic hydrazide, 4-(trimethoxysilyl)butanoic hydrazide, 4-(triethoxysilyl)butanoic hydrazide, 2-(trimethoxysilyl)benzohydrazide, 2-(triethoxysilyl)benzohydrazide, 4-(trimethoxysilyl)benzohydrazide, 4-(triethoxysilyl)benzohydrazide, and the like. These alkoxysilyl group-including hydrazide compounds may be used solely or in combination of two or more types thereof.

Examples of the method of adding the polar group-including hydrazide compound to the diene rubber latex or the like may include the three methods described below. The first method includes the steps of: coagulating the diene rubber latex subjected to an oxidizing reaction; shredding the coagulated product to a crumb-like state; and adding the polar group-including hydrazide compound thereto. Thereafter, a blending process is carried out by using, for example, a mixer, an extruder, a prebreaker, or the like, to obtain a modified diene rubber in a dry state.

The second method includes the steps of coagulating the diene rubber latex subjected to an oxidizing reaction; shredding and drying the coagulated product; and adding the polar group-including hydrazide compound thereto. This method includes, for example, a process of adding a solution of the polar group-including hydrazide compound to the oxidized diene rubber in a dry and solid state by using an mixer, an extruder, a prebreaker or the like. Blending by a prebreaker is preferable in terms of improving dispersion properties.

The third method includes the steps of: adding water (and optionally an emulsifier) to the diene rubber latex subjected to an oxidizing reaction and further adding the polar group-including hydrazide compound thereto; and stirring the mixture at a predetermined temperature such that the diene rubber latex is reacted with the polar group-including hydrazide compound. It should be noted that, when the polar group-including hydrazide compound is added to the oxidized diene rubber latex, an emulsifier is added to the oxidized diene rubber latex prior to the addition of the hydrazide compound thereto; or, alternatively, the polar group-including hydrazide compound is emulsified in advance and the hydrazide compound thus emulsified is added to the oxidized diene rubber latex. Further, an organic peroxide may be added according to necessity. The type of the emulsifier which can be used is not particularly restricted and examples thereof include a non-ionic surfactant such as polyoxyethylene lauryl ether, and the like. A modified diene rubber can be obtained by adding the polar group-including hydrazide compound to the oxidized diene rubber latex, effecting a reaction therebetween, and coagulating and drying the modified diene rubber latex thus obtained, as described above.

The type of a coagulant used for coagulating the oxidized diene rubber latex or the modified diene rubber latex in the aforementioned three methods is not particularly restricted, and examples thereof include an acid such as formic acid, sulfuric acid and a salt such as sodium chloride. The process of drying the oxidized diene rubber latex or the modified diene rubber latex can be carried out by using a drier such as a vacuum drier, an air drier, a drum drier or the like.

The modified diene rubber obtained as described above has, at a terminal end of a molecular chain of diene rubber, a polar group-including functional group represented by formula (I) below.

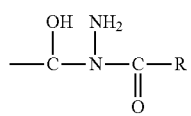

(I)

In the formula (1), R represents at least one type of polar group selected from the group consisting of: C1-C4 alkylene group having at least one type of a polar group selected from the group consisting of amino, imino, nitryl, ammonium, imido, amido, hydrazo, azo, diazo, hydroxyl, carboxyl, carbonyl, epoxy, oxycarbonyl group, tin-containing group and alkoxysilyl group; a phenylene group having as a substituent group at least one type of said polar groups; and nitrogen-containing heterocyclic group, oxygen-containing heterocyclic group. "R" in the formula (I) derives from a portion other than hydrazide group, of the aforementioned polar group-containing hydrazide compound.

When the modified diene rubber is blended with a filler such as carbon black, silica and the like, it is important that a relatively small amount of polar group is evenly introduced to respective molecules of diene rubber in terms of improving low-loss properties and wear resistance without sacrificing workability. The amount of the polar group-including hydrazide compound to be added in the modified diene rubber is preferably 0.01 to 5.0 mass %, more preferably 0.01 to 1.0 mass %, with respect to rubber components in the diene rubber.

The weight average molecular weight of the modified diene rubber, measured by GPC in terms of polystyrene equivalents, is preferably not smaller than 200,000 and more preferably not smaller than 400,000 in terms of ensuring excellent low-loss properties, wear resistance and fracture resistance as a rubber component.

A rubber composition of the present invention characteristically includes the modified diene rubber described above. Further the rubber composition preferably includes a filler. In the present embodiment, the amount of the filler to be blended is, although it is not particularly restricted, preferably in the range of 5 to 100 parts by mass, and more preferably in the range of 10 to 70 parts by mass, with respect to 100 parts by mass of the modified diene rubber. In a case where the blended amount of the filler is less than 5 parts by mass, sufficient reinforcing properties may not be obtained. In a case where the blended amount of the filler exceeds 100 parts by mass, workability of the rubber may deteriorate.

Carbon black and/or an inorganic filler can be used as the filler for use in the rubber composition of the present invention. Examples of the inorganic filler include silica and an inorganic compound represented by formula (I) below:

$$nM.xSiO_y.zH_2O \qquad (I)$$

In formula (I), M represents at least one type of component selected from the group consisting of: a metal selected from the group consisting of aluminum, magnesium, titanium, calcium and zirconium; oxides or hydroxides of these metals; hydrates thereof; and carbonates of these metals, and the numbers n, x, y and z represent integers in the range of 1 to 5, 0 to 10, 2 to 5, and 0 to 10, respectively. The aforementioned fillers may be used either solely or in combination of two or more types thereof.

Examples of the carbon black include GPF, FEF, SRF, HAF, ISAF, SAF grades and the like. Examples of the silica include wet silica, dry silica, and colloidal silica, and the like. Further, examples of the inorganic compound of the formula (II) include: alumina ($Al_2O_3$) such as γ-alumina, α-alumina, and the like; alumina monohydrate ($Al_2O_3.H_2O$) such as boehmite, diaspore, and the like; aluminum hydroxide [$Al(OH)_3$] such as gibbsite, bayerite, and the like; other compounds such as aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [Ca(OH)$_2$], aluminum magnesium oxide (MgO.Al$_2$O$_3$), clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentnite (Al$_2$O$_3$.4SiO$_2$.2H$_2$O), aluminum silicate (Al$_2$SiO$_5$.Al$_4$.3SiO$_4$.5H$_2$O), magnesium silicate (Mg$_2$SiO$_4$, MgSiO$_3$, etc.), calcium silicate (Ca$_2$SiO$_4$), aluminum calcium silicate (Al$_2$O$_3$.CaO.2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$], and crystalline alumino silicate salt containing hydrogen, alkali metal or alkali earth metal for correcting charge such as various types of zeolite, and the like.

In addition to the aforementioned modified diene rubber and the filler, an auxiliary agent which is normally used in the rubber industry, e.g. anti-aging agent, softener, silane coupling agent, stearic acid, zinc white, vulcanization accelerator, vulcanizing agent, and the like, can be selectively added to the rubber composition of the present invention, unless addition thereof adversely affects the object of the present invention. Commercially available products can be suitably used as the auxiliary agent described above. The rubber composition of the present invention can be produced by blending various auxiliary agents appropriately selected according to necessity, to the modified diene rubber, and carrying out kneading, heating, extrusion and the like to the mixture.

A tire of the present invention is characterized in that it uses the aforementioned rubber composition, preferably for tread thereof. The tire using the rubber composition in tread thereof is excellent in low fuel consumption property, fracture resistance and wear resistance. The tire of the present invention is not subjected to any particular restrictions, except that the aforementioned rubber composition is to be used for any of tire members thereof, and thus can be produced according to the conventional method. Examples of gas which can be used to fill the tire with it include normal air, air of which oxygen partial pressure has been adjusted, and an inert gas such as nitrogen, argon, helium, and the like.

The present invention will be described further in detail by Examples below. The present invention is not subjected to any restrictions by these Examples.

EXAMPLES

Example 1

Process of Producing Oxidized Natural Rubber

Condensed latex (dry rubber concentration: 60%) was obtained by centrifuging field latex at a rotation rate of 7500 rpm by using a latex separator manufactured by Saito Separator Ltd. 1000 g of the condensed latex thus obtained was charged into a reaction vessel made of stainless and provided with a stirrer and a temperature-adjusting jacket, and 1000 g of water was added thereto. 9.0 g of potassium persulfate and 3.0 g of propionaldehyde were then added to the reaction vessel and the resulting mixture was stirred for 30 hours at 60° C. to facilitate a reaction, whereby oxidized natural rubber latex was obtained. Next, pH of the oxidized natural rubber latex was adjusted to 4.7 by adding formic acid thereto, so that the latex was coagulated. The obtained coagulated substance was processed by a scraper by five times and then shredded to a crumb-like state by passing it through a shredder.
(Modification Process)

The dry rubber content of the coagulated substance thus obtained was analyzed, and then the coagulated substance (600 g when converted to dry rubber weight) and an emulsion solution of 3.0 g of isonicotinohydrazide were blended inside a prebreaker at a rotational rate of 30 rpm for 2 minutes at the room temperature so that the coagulated substance and the emulsion solution were evenly dispersed, whereby a dry, modified natural rubber A was obtained. Further, the modified natural rubber A was extracted by petroleum ether and further by a 2:1 mixed solvent of acetone and methanol, to separate the hydrazide compound which had not been reacted. However, no unreacted hydrazide compound was detected by the analysis of the extracts. Accordingly, the amount of isonicotinohydrazide added to the modified natural rubber A was 0.51 mass % with respect to the rubber component in the natural rubber latex. Further, the weight average molecular weight (Mw) of the modified natural rubber A in terms of polystyrene equivalents was obtained with reference to monodispersed polystyrene by gel permeation chromatography [GPC: HLC-8020 manufactured by Tosoh Corporation, Column: GMH-XL manufactured by Tosoh Corporation (2 columns in series), Detector: Refractive Index Detector (RI)].

Examples 2 to 7

Modified natural rubbers B-G were obtained by Examples 2 to 7, respectively, which Examples were conducted basically in the same manner as Example 1, except that 3.0 g of isonicotinohydrazide in the latter was replaced by following compounds in the former: 3.0 g of 3-(dimethylamino)propionic hydrazide in Example 2; 3.9 g of 4-(dimethylamino)benzohydrazide in Example 3; 3.3 g of 4-hydroxybenzohydrazide in Example 4; 3.9 g of 4-benzoic hydrazide in Example 5; 8.5 g of 4-(tributyltin)butanoic hydrazide in Example 6; and 5.6 g of 4-(trimethoxysilyl)benzohydrazide in Example 7. Further, the added amount of the polar group-including hydrazide compound in each of the modified natural rubbers B to G was analyzed in the same manner as in the modified natural rubber A to obtain the weight average molecular weight (Mw) thereof. The results are shown in Table 1.

Example 8

Process of Producing Oxidized Natural Rubber

Condensed latex (dry rubber concentration: 60%) was obtained by centrifuging field latex at a rotation rate of 7500 rpm by using a latex separator manufactured by Saito Separator Ltd. 1000 g of the condensed latex thus obtained was charged into a reaction vessel made of stainless and provided with a stirrer and a temperature-adjusting jacket, and 1000 g of water was added thereto. 9.0 g of potassium persulfate and 3.0 g of propionaldehyde were then added to the reaction vessel and the resulting mixture was stirred for 30 hours at 60° C. to facilitate a reaction, whereby oxidized natural rubber latex was obtained.
(Modifying Process)

10 ml of water and 90 mg of an emulsifier ("Emalgen 1108" manufactured by Kao Corporation) were added to 3.0 g of isonicotinohydrazide to obtain an emulsion. The emulsion was added to the oxidized natural rubber latex obtained in the previous step. The mixture was stirred at 60° C. for 12 hours, whereby a modified natural rubber latex was obtained.
(Coagulation and Drying Processes)

Next, pH of the modified natural rubber latex was adjusted to 4.7 by adding formic acid thereto, so that the latex was coagulated. The obtained coagulated or solid substance was processed by a scraper by five times and then shredded to a crumb-like state by passing it through a shredder. Thereafter, the shredded substance was dried at 110° C. for 210 minutes by a hot gas drier, whereby a modified natural rubber H was obtained. Further, the added amount of the polar group-including hydrazide compound in the modified natural rubber H was analyzed in the same manner as in the modified natural rubber A to obtain the weight average molecular weight (Mw) thereof. The results are shown in Table 1.

Modified natural rubbers I and J were obtained by Examples 9 and 10, respectively, which Examples were conducted basically in the same manner as Example 8, except that 3.0 g of isonicotinohydrazide in the latter was replaced by following compounds in the former: 3.0 g of 3-(dimethylamino)propionic hydrazide in Example 9; and 3.3 g of 4-hydroxybenzohydrazide in Example 10. Further, the added amount of the polar group-including hydrazide compound in each of the modified natural rubbers I, J was analyzed in the same manner as in the modified natural rubber A to obtain the weight average molecular weight (Mw) thereof. The results are shown in Table 1.

Comparative Example 1

Modification Reaction Process of Natural Rubber Latex

Condensed latex (dry rubber concentration: 60%) was obtained by centrifuging field latex at a rotation rate of 7500 rpm by using a latex separator manufactured by Saito Separator Ltd. 1000 g of the condensed latex thus obtained was charged into a reaction vessel made of stainless and provided with a stirrer and a temperature-adjusting jacket. An emulsion prepared in advance by adding 10 ml of water and 90 mg of an emulsifier ("Emalgen 1108" manufactured by Kao Corporation) to 3.0 g of N,N-diethylaminoethyl methacrylate and emulsifying the mixture, was added together with 990 ml of water to the reaction vessel and the resulting mixture was stirred for 30 minutes with carrying out replacement by nitrogen gas. Next, 1.2 g of tert-butyl hydroperoxide and 1.2 g of tetraethylenepentamine were added to the reaction mixture and a reaction was allowed to proceed at 40° C. for 1 hour, whereby a modified natural rubber latex was obtained.

(Coagulation and Drying Processes)

Next, pH of the modified natural rubber latex was adjusted to 4.7 by adding formic acid thereto, so that the modified natural rubber latex was coagulated. The obtained coagulated or solid substance was processed by a scraper by five times and then shredded to a crumb-like state by passing it through a shredder. Thereafter, the shredded substance was dried at 110° C. for 210 minutes by a hot gas drier, whereby a modified natural rubber K was obtained. It was confirmed from the mass of the modified natural rubber K thus obtained that the conversion rate of the added N,N-diethylaminoethyl methacrylate was 100%. Further, the modified natural rubber K was extracted by petroleum ether and further by a 2:1 mixed solvent of acetone and methanol, to separate homopolymer. However, no homopolymer was detected by the analysis of the extracts and it was confirmed that 100% of the added monomer had been introduced to the natural rubber molecules. Further, the weight average molecular weight (Mw) of the modified natural rubber K was obtained in a manner similar to the case of the modified natural rubber A. The results are shown in Table 2.

Comparative Examples 2, 3

Modified natural rubbers L and M were obtained by Comparative Examples 2 and 3, respectively, which Comp. Examples were conducted basically in the same manner as Comp. Example 1, except that 3.0 g of N,N-diethylaminoethyl methacrylate in the latter was replaced by following compounds in the former: 2.1 g of 2-hydroxyethylmethacrylate in Comp. Example 2; and 1.7 g of 4-vinylpyridine in Comp. Example 3. Further, analysis of the modified natural rubbers L, M as in the case of the modified natural rubber K revealed that 100% of the polar group-including monomer added to the rubbers L, M, respectively, had actually been introduced to the natural rubber molecules. Yet further, the weight average molecular weight (Mw) of each of the modified natural rubbers L, M was obtained in a manner similar to the case of the modified natural rubber A. The results are shown in Table 2.

Comparative Example 4

Condensed latex (dry rubber concentration: 60%) was obtained by centrifuging field latex at a rotation rate of 7500 rpm by using a latex separator manufactured by Saito Separator Ltd. 1000 g of the condensed latex thus obtained was charged into a reaction vessel made of stainless and provided with a stirrer and a temperature-adjusting jacket, and 1000 g of water was added thereto. 9.0 g of potassium persulfate and 3.0 g of propionaldehyde were then added to the reaction vessel and the resulting mixture was stirred for 30 hours at 60° C. to facilitate a reaction, whereby oxidized natural rubber latex was obtained. Next, pH of the oxidized natural rubber latex was adjusted to 4.7 by adding formic acid thereto, so that the oxidized natural rubber latex was coagulated. The obtained coagulated substance was processed by a scraper by five times and then shredded to a crumb-like state by passing it through a shredder. Thereafter, the shredded substance was dried at 110° C. for 210 minutes by a hot gas drier, whereby an oxidized natural rubber N was obtained. Further, the weight average molecular weight (Mw) of the oxidized natural rubber N was obtained in a manner similar to the case of the modified natural rubber A. The results are shown in Table 2.

Comparative Example 5

The pH value of field latex was adjusted to 4.7 by adding formic acid thereto, so that the field latex was coagulated. The obtained coagulated substance was processed by a scraper by five times and then shredded to a crumb-like state by passing it through a shredder. Thereafter, the shredded substance was dried at 110° C. for 210 minutes by a hot gas drier, whereby a natural rubber 0 was obtained. The weight average molecular weight (Mw) of the natural rubber 0 was obtained in a manner similar to the case of the modified natural rubber A. The results are shown in Table 2.

Example 11

A coagulated substance of oxidized styrene butadiene rubber (SBR) was obtained in a manner similar to the oxidized natural rubber production process of Example 1, except that the emulsion of Example 1 was replaced by SBR emulsion 0561 manufactured by JSR Corporation (the total solid content: 69%, pH: 10.3). Further, a modified SBR1 was obtained in a manner similar to the operation methods after the modification process of Example 1, except that the coagulated substance of the oxidized natural rubber of Example 1 was replaced by the coagulated substance of the oxidized SBR equivalent to dry rubber weight of 600 g. Further, the added amount of the polar group-including hydrazide compound in the oxidized SBR was analyzed in the same manner as in the modified natural rubber A to obtain the weight average molecular weight (Mw) thereof. The added amount of the hydrazide compound was 0.50% and the weight average molecular weight was 27.3000.

Comparative Example 6

1500 g of the SBR emulsion 0561 manufactured by JSR Corporation (the total solid content: 69%, pH: 10.3) was diluted with water to have a solid content of 20%, then coagulated by using sulfuric acid, dehydrated and dried, to obtain a dry SBR1. The weight average molecular weight (Mw) of the dry SBR1 was obtained in the same manner as in the modified natural rubber A. It was confirmed that the Mw of the dry SBR1 was 45.2000.

Comparative Example 7

An oxidized SBR1 was obtained by dehydrating and drying the coagulated substance of the oxidized SBR obtained in Example 11 as it was. The weight average molecular weight (Mw) of the oxidized SBR1 was obtained in the same manner as in the modified natural rubber A. It was confirmed that the Mw of the oxidized SBR1 was 26.1000.

A modified SBR2 was obtained in a manner similar to Example 8, except that the condensed latex of natural rubber of Example 8 was replaced by the SBR emulsion 0561 manufactured by JSR Corporation (the total solid content: 69%, pH: 10.3). Further, the added amount of the polar group-including hydrazide compound in the modified SBR2 was analyzed in the same manner as in the modified natural rubber A to obtain the weight average molecular weight (Mw) thereof. The added amount of the hydrazide compound was 0.49% and the weight average molecular weight was 24.3000.

TABLE 1

|  | Product | Polar group-including hydrazide compound | | | Weight average molecular weight (Mw) |
|---|---|---|---|---|---|
|  |  | Type | Added amount (g) | Added content (mass %) |  |
| Example 1 | Modified natural rubber A | Isonicotinohydrazide | 3.0 | 0.51 | 873,000 |
| Example 2 | Modified natural rubber B | 3-(dimethylamino)propionic hydrazide | 3.0 | 0.50 | 906,000 |
| Example 3 | Modified natural rubber C | 4-(dimethylamino)benzohydrazide | 3.9 | 0.65 | 890,000 |
| Example 4 | Modified natural rubber D | 4-hydroxybenzohydrazide | 3.3 | 0.54 | 915,000 |
| Example 5 | Modified natural rubber E | 4-benzoic hydrazide | 3.9 | 0.63 | 903,000 |
| Example 6 | Modified natural rubber F | 4-(tributyltin)butanoic hydrazide | 8.5 | 1.38 | 928,000 |
| Example 7 | Modified natural rubber G | 4-(trimethoxysilyl)benzohydrazide | 5.6 | 0.91 | 934,000 |
| Example 8 | Modified natural rubber H | Isonicotinohydrazide | 3.0 | 0.46 | 869,000 |
| Example 9 | Modified natural rubber I | 3-(dimethylamino)propionic hydrazide | 3.0 | 0.45 | 893,000 |
| Example 10 | Modified natural rubber J | 4-hydroxybenzohydrazide | 3.3 | 0.48 | 907,000 |

TABLE 2

|  | Product | Polar group-including monomer | | Conversion rate | Grafting efficiency | Added amount of surfactant (g) | t-BHPO (g) | TEPA (g) | Reaction temperature | Reaction time (minute) | Weight average molecular weight (Mw) |
|---|---|---|---|---|---|---|---|---|---|---|---|
|  |  | Type | Added amount (g) |  |  |  |  |  |  |  |  |
| Comp. Example 1 | Modified natural rubber K | N,N-diethylaminoethyl methacrylate | 3.0 | 100% | 100% | 0.09 | 1.2 | 1.2 | 40° C. | 60 | 1,327,000 |
| Comp. Example 2 | Modified natural rubber L | 2-hydroxyethyl-methacrylate | 2.1 | 100% | 100% | 0.09 | 1.2 | 1.2 | 40° C. | 60 | 1,354,000 |

TABLE 2-continued

| | Product | Polar group-including monomer | | | | Added amount of surfactant (g) | t-BHPO (g) | TEPA (g) | Reaction temperature | Reaction time (minute) | Weight average molecular weight (Mw) |
| | | Type | Added amount (g) | Conversion rate | Grafting efficiency | | | | | | |
|---|---|---|---|---|---|---|---|---|---|---|---|
| Comp. Example 3 | Modified natural rubber M | 4-vinylpyridine | 1.7 | 100% | 100% | 0.09 | 1.2 | 1.2 | 40° C. | 60 | 1,298,000 |
| Comp. Example 4 | Modified natural rubber N | — | — | — | — | — | — | — | — | — | 848,000 |
| Comp. Example 5 | Natural rubber O | — | — | — | — | — | — | — | — | — | 1,263,000 |

Next, rubber compositions according to the blending prescriptions shown in Table 3 were prepared by blending using a plastmil, and Mooney viscosity, tensile strength (Tb), tan δ, and wear resistance of the respective rubber components were measured and evaluated by the method described below. The results of the rubber composition according to the blend 1 are shown in Table 4, those of the rubber composition according to the blend 2 are shown in Table 5, and those of the rubber composition using various types of SBR as rubber components are shown in Table 6.

(1) Mooney Viscosity

Mooney viscosity (ML1+4, 130° C.) of each of the rubber components was measured at 130° C. according to JIS K6300-1:2001. The smaller value of Mooney viscosity represents the better workability.

(2) Tensile Strength

A tensile test was carried out according to JIS K6251-2004 for each of the vulcanized rubbers obtained by vulcanizing the aforementioned respective rubber compositions at 145° C. for 33 minutes, to measure tensile strength (Tb) thereof. The higher tensile strength represents the better fracture resistance.

(3) Tan δ

Loss tangent (tan δ), of each of the vulcanized rubbers obtained by vulcanizing the aforementioned respective rubber compositions at 145° C. for 33 minutes, was measured by using a viscoelasticity measuring device (manufactured by Rheometric Scientific, Inc.) at the temperature: 50° C., strain: 5%, and frequency: 15 Hz. The smaller tan δ represents the more satisfactory low-loss properties.

(4) Wear Resistance

Wear resistance, of each of the vulcanized rubbers obtained by vulcanizing the aforementioned respective rubber compositions at 145° C. for 33 minutes, was measured by using a Lambourn abrasion tester at the room temperature and a slip rate 60%. The results of Examples 13 to 21 and Comp. Examples 8 to 11 are expressed as index values, respectively, relative to the reciprocal of the amount of wear of Comp. 11 being 100, the results of Examples 22 to 30 and Comp. Examples 12 to 16 are expressed as index values, respectively, relative to the reciprocal of the amount of wear of Comp. 16 being 100, the results of Examples 31 to 32 and Comp. Examples 17 and 18 are expressed as index values, respectively, relative to the reciprocal of the amount of wear of Comp. 17 being 100, and the results of Examples 33 and 34 and Comp. Examples 19 and 20 are expressed as index values, respectively, relative to the reciprocal of the amount of wear of Comp. 19 being 100. The larger index value represents the smaller amount of wear, i.e. the better wear resistance.

TABLE 3

| | Blending prescription (parts by mass) | |
|---|---|---|
| | Blend 1 | Blend 2 |
| Rubber component *1 | 100 | 100 |
| Carbon black N339 | 50 | — |
| Silica *2 | — | 55 |
| Silica coupling agent *3 | — | 5.5 |
| Aromatic oil | 5 | 10 |
| Stearic acid | 2 | 2 |
| Anti-aging agent 6C *4 | 1 | 1 |
| Zinc white | 3 | 3 |
| Vulcanization accelerator DZ *5 | 0.8 | — |
| Vulcanization accelerator DPG *6 | — | 1 |
| Vulcanization accelerator DM *7 | — | 1 |
| Vulcanization accelerator NS *8 | — | 1 |
| Sulfur | 1 | 1.5 |

*1 The types of used rubber components are shown in Tables 4 and 5.
*2 Trademark "Nipsil AQ", manufactured by Tosoh Silica Corporation
*3 Trademark "Si69", bis(3-triethoxysilylpropyl)tetrasulfide, manufactured by Degussa Gmbh
*4 N-(1,3-dimethylbutyl)-N'-phenyl-p-phenylenediamine
*5 N,N'-dicyclohexyl-2-benzomiazolyl sulfenamido
*6 Diphenylguanidine
*7 Dibenzothiadyl disulfide
*8 N-t-butyl-2-benzomiazolyl sulfenamido

TABLE 4

| | Example 13 | Example 14 | Example 15 | Example 16 | Example 17 | Example 18 | Example 19 |
|---|---|---|---|---|---|---|---|
| Blend prescription | | | | Blend 1 | | | |
| Rubber component | A | B | C | D | E | F | H |
| Mooney viscosity (ML1 + 4, 130° C.) | 63 | 67 | 71 | 69 | 70 | 72 | 64 |
| Tb (MPa) | 27.0 | 26.5 | 27.0 | 26.2 | 25.1 | 26.8 | 26.5 |

TABLE 4-continued

|  |  |  |  |  |  |  |  |
|---|---|---|---|---|---|---|---|
| tanδ | 0.121 | 0.130 | 0.128 | 0.137 | 0.144 | 0.120 | 0.124 |
| Wear resistance (Index) | 125 | 114 | 122 | 113 | 114 | 120 | 122 |

|  | Example 20 | Example 21 | Comp. Example 8 | Comp. Example 9 | Comp. Example 10 | Comp. Example 11 |
|---|---|---|---|---|---|---|
| Blend prescription | | | Blend 1 | | | |
| Rubber component | I | J | K | M | N | O |
| Mooney viscosity (ML1 + 4, 130° C.) | 69 | 72 | 78 | 76 | 64 | 72 |
| Tb (MPa) | 26.1 | 25.4 | 27.3 | 27.0 | 23.9 | 25.1 |
| tanδ | 0.132 | 0.140 | 0.153 | 0.151 | 0.205 | 0.188 |
| Wear resistance (Index) | 112 | 116 | 110 | 112 | 92 | 100 |

TABLE 5

|  | Example 22 | Example 23 | Example 24 | Example 25 | Example 26 | Example 27 | Example 28 | Example 29 |
|---|---|---|---|---|---|---|---|---|
| Blend prescription | | | | Blend 2 | | | | |
| Rubber component | A | B | C | D | E | G | H | I |
| Mooney viscosity (ML1 + 4, 130° C.) | 83 | 82 | 80 | 84 | 82 | 88 | 81 | 84 |
| Tb (MPa) | 25.2 | 25.2 | 24.8 | 24.6 | 24.2 | 25.5 | 25.0 | 25.1 |
| tanδ | 0.088 | 0.094 | 0.102 | 0.100 | 0.095 | 0.092 | 0.091 | 0.097 |
| Wear resistance (Index) | 120 | 118 | 118 | 115 | 114 | 120 | 119 | 114 |

|  | Example 30 | Comp. Example 12 | Comp. Example 13 | Comp. Example 14 | Comp. Example 15 | Comp. Example 16 |
|---|---|---|---|---|---|---|
| Blend prescription | | | Blend 2 | | | |
| Rubber component | J | K | L | M | N | O |
| Mooney viscosity (ML1 + 4, 130° C.) | 81 | 89 | 91 | 90 | 76 | 85 |
| Tb (MPa) | 24.7 | 24.8 | 25.1 | 24.5 | 21.9 | 23.3 |
| tanδ | 0.102 | 0.112 | 0.111 | 0.108 | 0.146 | 0.135 |
| Wear resistance (Index) | 113 | 110 | 108 | 111 | 92 | 100 |

On the comparison of Examples with Comparative Examples in Tables 4 and 5, it is understood that fracture resistance, low-loss properties and wear resistance of a rubber composition can be significantly improved by using in place of natural rubber a modified natural rubber obtained by first oxidizing a natural rubber and then modifying the oxidized natural rubber by a polar group-including hydrazide compound. Further, it is understood that low-loss properties are improved more significantly in Examples than in Comp. Examples 1, 2 and 5 to 7 in which Comp. Example a polar group are grafted at an inner portion of a main chain of natural rubber.

TABLE 6

| | Example 31 | Example 32 | Comp. Example 17 | Comp. Example 18 | Example 33 | Example 34 | Comp. Example 19 | Comp. Example 20 |
|---|---|---|---|---|---|---|---|---|
| Blend prescription | Blend 1 | | | | Blend 2 | | | |
| Rubber component | Modified SBR1 | Modified SBR2 | Dried SBR1 | Oxidized SBR1 | Modified SBR1 | Modified SBR2 | Dried SBR1 | Oxidized SBR1 |
| Mooney viscosity (ML1 + 4, 130° C.) | 60 | 60 | 65 | 45 | 73 | 71 | 78 | 59 |
| Tb (MPa) | 23.2 | 22.8 | 23.5 | 15.6 | 19.5 | 20.1 | 18.3 | 12.5 |
| tanδ | 0.122 | 0.111 | 0.128 | 0.142 | 0.108 | 0.110 | 0.121 | 0.148 |
| Wear resistance (Index) | 113 | 116 | 100 | 83 | 114 | 116 | 100 | 78 |

On the comparison of Examples with Comparative Examples in Table 6, it is understood that fracture resistance of a rubber composition is at least maintained at the same level or can be improved and that low-loss properties and wear resistance of the rubber composition can be significantly improved by using in place of SBR a modified SBR obtained by first oxidizing a SBR and then modifying the oxidized SBR by a polar group-including hydrazide compound.

The invention claimed is:

1. A modified diene rubber, produced by first oxidizing diene rubber latex and then adding a hydrazide compound including at least a polar group within a molecule thereof to a terminal end of a molecular chain of the diene rubber.

2. The modified diene rubber of claim 1, wherein the diene rubber latex is natural rubber latex.

3. The modified diene rubber of claim 1, wherein an amount of the hydrazide compound to be added is 0.01 to 5.0 mass % with respect to a rubber component in the diene rubber latex.

4. The modified diene rubber of claim 1, wherein the polar group is at least one type of polar group selected from the group consisting of amino, imino, nitryl, ammonium, imido, amido, hydrazo, azo, diazo, hydroxyl, carboxyl, carbonyl, epoxy, oxycarbonyl group, nitrogen-containing heterocyclic group, oxygen-containing heterocyclic group, tin-containing group and alkoxysilyl group.

5. The modified diene rubber of claim 1, wherein the weight-average molecular weight thereof measured by Gel Permeation Chromatography (GPC) in terms of polystyrene equivalents is not smaller than 200,000.

6. The modified diene rubber of claim 1, wherein oxidation of the diene rubber latex is carried out by adding a carbonyl compound to the diene rubber latex to effect oxidization of the latex.

7. The modified diene rubber of claim 1, wherein oxidation is carried out by air oxidation or ozone oxidation.

8. The modified diene rubber of claim 7, wherein the air oxidation is carried out under the presence of a radical-generating agent.

9. The modified diene rubber of claim 6, wherein the carbonyl compound is an aldehyde and/or a ketone.

10. The modified diene rubber of claim 8, wherein the radical-generating agent is selected from the group consisting of a peroxide radical-generating agent, a redox radical-generating agent and an azo radical-generating agent.

11. A method of producing a modified diene rubber, comprising the steps of:

oxidizing a diene rubber latex;
coagulating the oxidized diene rubber latex;
adding a hydrazide compound including at least a polar group within a molecule thereof to the coagulated product of the oxidized diene rubber latex thus obtained, thereby causing the hydrazide compound to be reacted with and added to a terminal end of a molecular chain of diene rubber of the coagulated product of the oxidized diene rubber latex; and
drying the resulting product.

12. A method of producing a modified diene rubber, comprising the steps of:

oxidizing a diene rubber latex;
coagulating and drying the oxidized diene rubber latex to obtain an oxidized diene rubber; and
adding a hydrazide compound including at least a polar group within a molecule thereof to the oxidized diene rubber thus obtained, thereby causing the hydrazide compound to be reacted with and added to a terminal end of a molecular chain of diene rubber of the oxidized diene rubber.

13. A method of producing a modified diene rubber, comprising the steps of:

oxidizing a diene rubber latex;
adding a hydrazide compound including at least a polar group within a molecule thereof to the oxidized diene rubber latex thus obtained, thereby causing the hydrazide compound to be reacted with and added to a terminal end of a molecular chain of diene rubber in the oxidized diene rubber latex; and
coagulating and drying the resulting product.

14. A rubber composition, comprising the modified diene rubber of claim 1.

15. A tire, comprising a tire member made of the rubber composition of claim 14.

16. A natural rubber, characterized in that a terminal end of a molecular chain thereof has been modified, wherein the terminal end of the molecular chain has a hydrazide compound including at least a polar group within a molecule thereof, and said natural rubber is produced by first oxidizing natural rubber latex and then adding the hydrazide compound including at least a polar group within a molecule thereof to a terminal end of a molecular chain of the natural rubber.

17. A rubber composition, comprising the natural rubber of claim 16.

* * * * *